United States Patent
Valko et al.

(10) Patent No.: US 8,077,648 B2
(45) Date of Patent: Dec. 13, 2011

(54) VRM SELECTION

(75) Inventors: Andras Valko, Budapest (HU); Zoltan Turanyi, Szentendre (HU); Csaba Keszei, Budapest (HU); Atsushi Iwasaki, Tokyo (JP); Katsutoshi Nishida, Tokyo (JP)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 68 days.

(21) Appl. No.: 12/376,936

(22) PCT Filed: Aug. 9, 2006

(86) PCT No.: PCT/JP2006/316061
§ 371 (c)(1),
(2), (4) Date: Apr. 5, 2010

(87) PCT Pub. No.: WO2008/018150
PCT Pub. Date: Feb. 14, 2008

(65) Prior Publication Data
US 2010/0182960 A1    Jul. 22, 2010

(51) Int. Cl.
*G06C 17/00* (2006.01)
*H04W 4/00* (2009.01)
*H04W 36/00* (2009.01)

(52) U.S. Cl. ........ 370/311; 370/338; 455/439; 455/440; 455/443

(58) Field of Classification Search .................. 370/311, 370/338; 455/436–444
See application file for complete search history.

(56) References Cited

U.S. PATENT DOCUMENTS
2004/0258011 A1* 12/2004 Hiyama et al. ................ 370/328

FOREIGN PATENT DOCUMENTS
WO    WO 03/049377 A    6/2003

* cited by examiner

*Primary Examiner* — Ronald Abelson (57) ABSTRACT

There are provided a method, a network system, and a router capable of decreasing the chance of VRM or VLM changes so as to reduce signaling, and consequently contributing to better scalability. The method is applied to mobility management used in an IP-based network system, which contains a plurality of access routers (AR), location managers (LM) and routing managers (RM), through which a mobile node (MN) transmits and receives information. According to the method, a visited routing manager (VRM) where the MN is currently located monitors the MN, an AR currently communicating with the MN discriminates whether or not the MN is moving out of its connectivity range, and the VRM discriminates whether or not the MN is moving out of its control range. Then, the method switches mobility management over from the current AR to a new AR in accordance with the discrimination results, and switches mobility management over from the current VRM to a new VRM in accordance with the discrimination result.

12 Claims, 5 Drawing Sheets

VRM SELECTION

TECHNICAL FIELD

This invention relates to the selection of a VRM (Visited Routing Manager), and more particular to the selection of a VRM used in an IP-based network system where a mobile node is moving around.

BACKGROUND ART

The IP-based IMT network platform (hereinafter referred to as "$IP^2$") is a network architecture that supports terminal mobility with both route optimization and location privacy (see "Address interchange procedure in mobility management architecture for IP-based IMT network platform ($IP^2$)", Manhee Jo, Takatoshi Okagawa, Masahiro Sawada, Masami Yabusaki, 10th International Conference on Telecommunications ICT'2003, Feb. 23, 2003). Fundamental to $IP^2$ is the separation of the Network Control Layer (NCPF) and the Transport Network Layer (IP-BB). In the $IP^2$ architecture, the NCPF controls the IP-BB. The IP-BB consists of IP routers with additional packet processing features, such as temporary packet buffering or address switching. The NCPF consists of signaling servers that command the IP-BB entities intelligently.

Mobile terminals (or mobile nodes hereinafter referred to as "MN") are assigned permanent terminal identifiers that take the form of an IP address. In addition, MNs are assigned a routing address from the access router (AR) to which they are attached. The routing address is specific to the location of the MN, and to support location privacy, it shall not be revealed to other MNs. When the MN moves to another AR, a new routing address is allocated to it from the pool of routing addresses available at the new AR. The binding between the MN's terminal identifier (IPha: "IP home address") and its routing address (IPra: "IP routing address") is communicated to the NCPF by the AR. More specifically, the address is sent to the visited routing manager (VRM) of the MN that governs the MN's movement in the visited network. The VRM, in turn informs the home routing manager (HRM) of the MN about the IPra.

When a MN (MN1) wishes to send a packet to another MN (MN2), it uses MN2's IPha as the destination address in the packet and transmits the packet to its AR (AR1). AR1 (termed as the sending AR) detects that the packet is addressed to the IPha of MN2 and queries the NCPF. More specifically, it queries the HRM of MN2 about the IPra of MN2. The HRM responds to the queries, and the IPra of MN2 is stored in AR1 along with the IPha of MN2. Then, the destination address of the packet (IPha of MN2) is replaced with the IPra of MN2 and the source address (IPha of MN1) is replaced with the IPra of MN1. This operation is referred to as address switching. The packet is then delivered using traditional IP forwarding to the node that owns the IPra of MN2, that is, AR2. AR2 (the receiving AR) then replaces the destination and source addresses of the packet back to the IPha of MN2 and MN1, respectively. Finally AR2 delivers the packet to MN2.

One important function of $IP^2$ is the AR notification. Whenever MN2 moves to a new AR, the new AR allocates a new IPra for MN2 and the VRM is notified about this new IPra. Then, the VRM updates the HRM, which, in turn, updates AR1. In fact, the HRM updates all ARs that have MNs that send packets to MN2. That is, when an AR queries the HRM about the IPra of MN1, the HRM stores the identity of the querying AR and when the IPra of MN1 changes, the HRM updates all such ARs. This behaviour is termed as the AR being subscribed for updates of a particular $IP^2$ terminal identifier. Each query the AR makes about an $IP^2$ terminal identifier at the HRM results in the AR being subscribed at the given HRM for the given $IP^2$ terminal identifier.

MNs in $IP^2$ can be in Active or Dormant state. The description above corresponds to the Active state. In this state, VRMs and HRMS track the MN's mobility and location with fine AR granularity. When the MN does not communicate for extensive periods of time, it moves or is moved to Dormant state. In this state, VRMs and HRMS remove any state for the given MN. The location of the MN is now tracked with lower granularity by a different entity, namely, the Location Manager (LM). The ARs are grouped into Location Areas (LA) that determine the granularity of location tracking in Dormant state. The MN does not inform the network as it moves from one cell to another. Instead, when the MN moves to a new LA, it informs the network. Then, it sends a location update message to one AR of the LA. In turn, the AR forwards it to the Visited LM (VLM). When a CN (Correspondent Node) wishes to send a packet to the MN, its AR sends an Inquiry to the HRM of the MN. The HRM, having no information on the MN, queries the HLM, that knows about the relationship between the current VLM and the MN. The VLM pages the MN in its current location area. Then, the MN is activated, a VRM is selected and a routing state is built in both the VRM and the HRM, which can then respond to the original Inquiry.

The problem, which this invention tries to solve, is the selection of the VRM by the AR. In other words, how do the ARs know the address of the VRM to report the arrival of a new AR and its associated IPra? Also, how do the ARs select a VRM when the MN moves from Dormant to Active state? This issue is important since the VRM manages local states of the MN. To enable seamless mobility management, the ARs shall notify the same VRM about movements of an MN. Even if a new VRM is selected (e.g., a closer one for performance reasons), the identity of the old VRM must be known to the new VRM in order to allow the transfer of the MN's context from the old VRM to the new one and to remove the tate from the old VRM.

Similarly, the selection of VLMs also constitutes an issue to be solved.

Since $IP^2$ is a very recent development, no solutions have been published yet regarding the problems mentioned above. However, there exists some approaches available in similar protocols.

Regional Registrations described in "Mobile IP Regional Tunnel Management", E. Gustafsson, A. Jonsson and C. Perkins, draft-ietf-mobileip-reg-tunnel-08 (work in progress), November 2003, and "Hierarchical Mobile IPv6 mobility management (HMIPv6)", Hesham Soliman, Claude Catelluccia, Karim El Malki, Ludovic Bellier, draft-ietf-mipshop-hmipv6-02 (work in progress), Jun. 15, 2004 are also mobility protocols. However, they do not include routing managers. Node mobility is managed by the Gateway Foreign Agents (GFAs) and the Mobility Anchor Points (MAPs), respectively. Both serve as mobility aware packet forwarding entities such as ARs in case of $IP^2$. In these protocols, the MAP or the GFA is selected by the MN. Access Routers (or Foreign Agents in case of MIPv4) advertise the address of available GFAs and MAPs in Agent Advertisement messages. This allows Mobile Nodes to select one. Each time the MN moves to a new AR, it will state its current (or newly selected) GFA and MAP in the Registration (or Binding Update in MIPv6) message. When a new GFA or MAP is selected, the MN may include information about the old one to allow context transfer.

Another trivial solution would be to statically assign one VRM to each AR and always send reports to that VRM.

There are several problems with the above two approaches.

If the MN selects the identity of the VRM, then the network has no control over the VRM selected. This is unfortunate as it prevents the network to move MNs to or away from a specific VRM. (This could be helpful, e.g., when an VRM needs to be shut down temporarily for maintenance.)

A less terminal centric approach does not let the MN select the VRM, but is nevertheless aware of the identity of its current VRM. In that case, it can explicitly tell the AR which VRM to notify. This, however, results in exposing network internals to MNs, which is highly undesirable. Moreover, it allows various sorts of attacks against the network by malicious nodes, e.g., by deliberately specifying the wrong VRM, etc.

If the AR has a pre-specified VRM that is always used for reporting, then the wrong VRM is selected if the MN moves to an AR with a different VRM configured. In this case, neither the new VRM nor the new AR has any knowledge about the identity of the old VRM. Hence, context transfer is impossible.

DISCLOSURE OF INVENTION

Accordingly, the present invention is conceived as a response to the above-described disadvantages of the conventional art.

For example, a method, a network system, and a router according to the present invention are capable of decreasing the chances of VRM or VLM changes so as to reduce signaling, and contributing to a better scalability.

According to one aspect of the present invention, preferably, there is provided a method for mobility management used in an IP-based network system (1), which contains a plurality of access routers (AR), location managers (LM) and routing managers (RM), through which a mobile node (MN) transmits and receives information comprising the steps of: determining whether or not the mobile node is active; monitoring the mobile node via a visited routing manager (VRM) where the mobile node is currently located if the mobile node is active; first discriminating whether or not the mobile node is moving out of a connectivity range from an access router (AR) which is currently communicating with the mobile node; second discriminating whether or not the mobile node is moving out of a control range of the visited routing manager (VRM) which is currently managing the mobility of the mobile node; transferring context which the current access router holds to a new access router (35) in accordance with the discrimination results at the first and second discriminating steps.

The method preferably further comprises: the steps of: receiving an advertisement signal from the new access router at the mobile node prior to transferring the context; and sending an activation signal from the mobile node to the new access router in response to the advertisement signal.

The method preferably further comprises the step of sending an activation notification from the new access router to the visited routing manager (VRM) after transferring the context.

It is preferable that the context transfer is performed in a form of routing cache table.

Note that the location manager (LM) and the routing manager (RM) are responsible for mobility management.

Further note that the transferring step is performed in a case where it is discriminated at the second discriminating step that the mobile node is still located within the control range of the visited routing manager (VRM) which is currently managing the mobility of the mobile node.

Preferably, an identity of the current access router is informed of the new access router prior to transferring the context.

According to another aspect of the present invention, preferably, there is provided an IP-based network system, which contains a plurality of access routers (AR), location managers (LM) and routing managers (RM), through which a mobile node (MN) transmits and receives information, wherein each of the access routers comprises: means for determining whether or not the mobile node is active; means for monitoring mobility of the mobile node where it is currently located in a case where it is determined that the mobile is active; means for discriminating whether or not the mobile node with which is currently communicating is moving out of a connectivity range; and means for transferring context which is currently held to a new access router in accordance with the discrimination result, and each of the routing managers comprises: means for discriminating whether or not the mobile node which is currently being managed is moving out of a control range.

According to still another aspect of the present invention, preferably, there is provided a router used in IP-based network system, which contains a plurality of access routers (AR), location managers (LM) and routing managers (RM), through which a mobile node (MN) transmits and receives information, comprises: means for monitoring mobility of the mobile node where it is currently located; means for discriminating whether or not the mobile node which is currently communicating is moving out of a connectivity range; and means for transferring context which is currently held to a new access router in accordance with the discrimination result.

In a case where there is possibility where a mobile node might move out a control range of a visited routing manager which is currently managing the mobility of the mobile node, the following method is applicable.

More specifically, a method for mobility management used in an IP-based network system (1), which contains a plurality of access routers (AR), location managers (LM) and routing managers (RM), through which a mobile node (MN) transmits and receives information comprises the steps of: determining whether or not the mobile node is active; monitoring the mobile node via a visited routing manager (VRM 120) where the mobile node is currently located if the mobile node is active; first discriminating whether or not the mobile node is moving out of a connectivity range from an access router (37, 38) which is currently communicating with the mobile node; second discriminating whether or not the mobile node is moving out of a control range of the visited routing manager (VRM 120) which is currently managing the mobility of the mobile node; and transferring context which the current visited routing manager (VRM 120) holds to a new visited routing manager (VRM 121) in accordance with the discrimination results at the first and second discrimination steps.

The method, preferably, further comprises the steps of: sending an activation signal from the mobile node to a new access router (39) where the mobile node is newly moved in; and sending an activation notification from the new access router to the new visited routing manager (VRM 121) in response to the activation signal.

The method, preferably, further comprises the steps of: querying a home routing manager (HRM 122) of the mobile node about information on the current visited routing manager (VRM 120) by the new visited routing manager (VRM 121) in response to the activation notification; and receiving a response about the information on the current visited routing manager from the home routing manager prior to transferring the context.

In the above method, the plurality of access routers are preferably grouped into regions (REGION 1, REGION 2), each having two or more access routers which select the same visited routing manager for the same mobile node. As long as the mobile node is moving around within the region, both the current access router and the new access router preferably select the same routing manager. Note that the two or more access routers are preferably neighboring to each other.

It is further preferable that each of the plurality of access router has a prioritized list of visited routing managers for selecting the new visited routing manager used when receiving an activation signal (ACT) from the mobile node.

Further note that the transferring step is performed in a case where it is discriminated at the second discriminating step that the mobile node is moving out of a control range of the visited routing manager (VRM 120) which is currently managing the mobility of the mobile node.

In a case where the above method is applicable, the following IP-based network system is preferable.

More specifically, an IP-based network system, which contains a plurality of access routers (AR), location managers (LM) and routing managers (RM), through which a mobile node (MN) transmits and receives information, wherein each of the access routers comprises: means for monitoring mobility of the mobile node where it is currently located; and means for discriminating whether or not a new mobile node is moving in a connectivity range; and means for, in accordance with the discrimination result, notifying of a corresponding routing manager the fact that the new mobile node is moving in, and each of the routing managers comprises: means for detecting that the new mobile node is moving in a control range, based on the notification; and means for receiving context transferred from another routing manager which was responsible for mobility management.

A router used in the above system, which contains a plurality of access routers (AR), location managers (LM) and routing managers (RM), through which a mobile node (MN) transmits and receives information, preferably comprises: means for monitoring mobility of the mobile node where it is currently located; means for discriminating whether or not a new mobile node is moving in a connectivity range; and means for, in accordance with the discrimination result, notifying of a corresponding routing manager the fact that the new mobile node is moving in.

Furthermore, in a case where a mobile node is dormant, the following method is applicable.

More specifically, a method for mobility management used in an IP-based network system (1), which contains a plurality of access routers (AR), location managers (LM) and routing managers (RM), through which a mobile node (MN) transmits and receives information comprises the steps of: determining whether or not the mobile node is active; monitoring a location of the mobile node by a Visited location manager (VLM 110) if the mobile is dormant; discriminating whether or not the mobile node is moving out of a control range of the visited location manager (VLM 110) which is currently managing the mobility of the mobile node; and transferring location information which the current visited location manager (VLM 110) holds to a new visited location manager (VLM 111) in accordance with the discrimination result at the discrimination step.

It is preferable in the above method that the transferring the location information takes place when switching mobility management over from the current visited location manager to the new visited location manager.

The above method, preferably, further comprises the steps of: querying a home location manager (HLM) of the mobile node about information on the current visited location manager by the new visited location manager; and receiving a response about the information on the current visited location manager from the home location manager prior to transferring the location information.

Note that the plurality of access routers are preferably grouped into regions (LA1, LA2), and each location manager is responsible for location management of the mobile node located in the same group. As long as the mobile node is moving around within the same region, all access routers within the same region preferably select the same location manager.

In a case where the above method is applicable, the following IP-based network system is preferable.

More specifically, an IP-based network system, which contains a plurality of access routers (AR), location managers (LM) and routing managers (RM), through which a mobile node (MN) transmits and receives information, wherein each of the routing managers comprises: means for monitoring location of the mobile node where it is currently located; means for discriminating whether or not the mobile node which is currently being monitored is moving out of a management range; and means for switching location management over from the current location manager to a new location manager in accordance with the discrimination result.

The invention is particularly advantageous since the chances of VRM or VLM changes are reduced when a mobile node moves, and signaling is consequently reduced.

With proper configuration, the current VRM or VLM is selected with high probability. This contributes to scalability.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

A preferred embodiment of the present invention will now be described in detail in accordance with the accompanying drawings.

Figure 1:
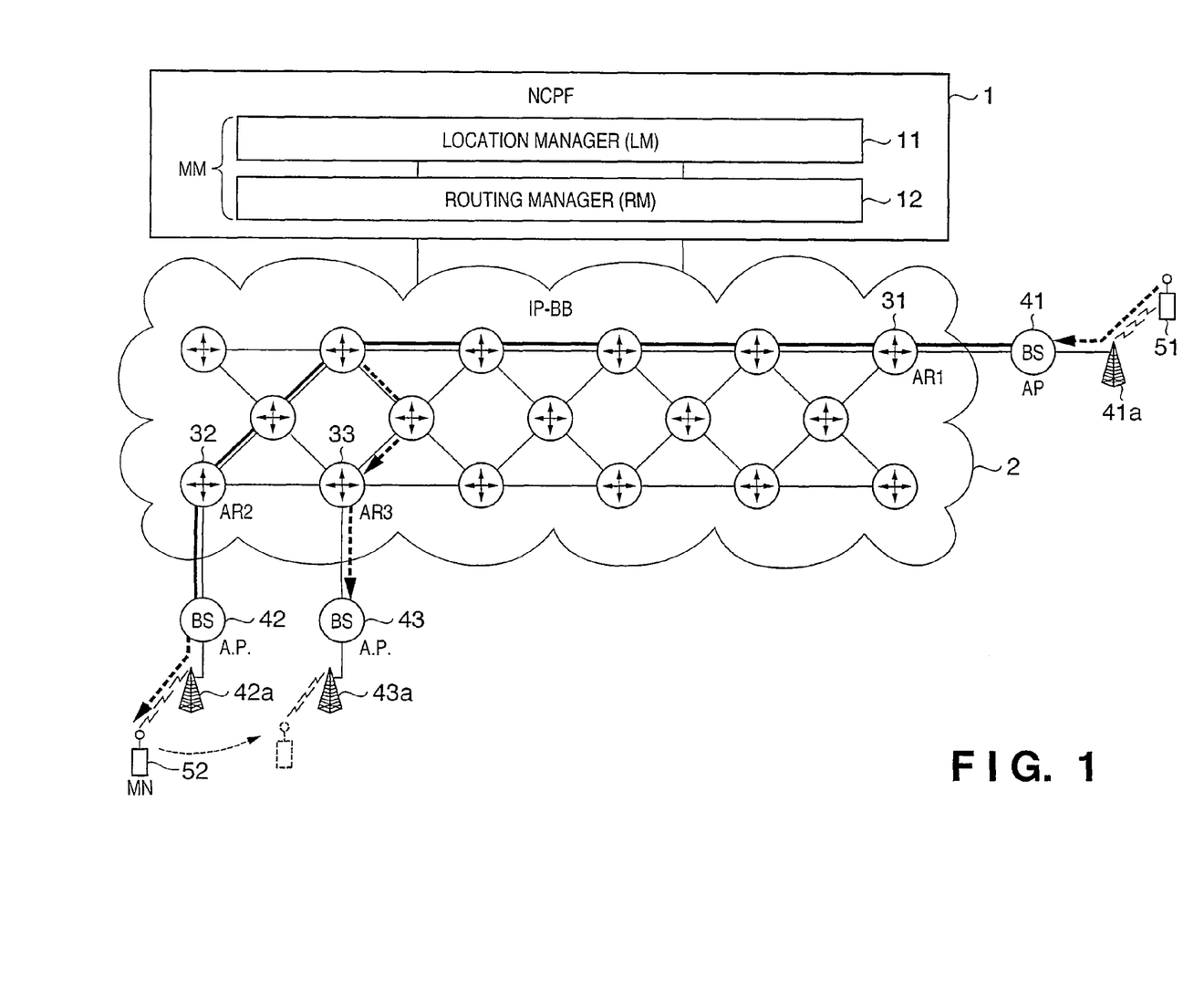
FIG. 1 is a conceptual overview showing an IP-based network system according to a typical embodiment of the present invention.

FIG. 1 is a conceptual overview showing an IP² network system according to a typical embodiment of the present invention.

The network system includes an NCPF 1 which plays a role in Mobility Management as a part of the functions and an IP-BB (IP BackBone) 2. The NCPF 1 contains a location manager (LM) 11 which manages location information of a mobile node and performs paging when the mobile node is dormant, and a routing manager (RM) 12 which performs packet routing and handover control when the mobile node is active.

As shown in FIG. 1, the IP-BB 2 contains a plurality of routers (access routers) 31, 32, and 33, which receive/transmit packets, and a plurality of routers (relay routers), which relay the packets. Note that access routers and relay routers are generally referred to as "routers". Each router contains a control unit, a high-speed access memory and a high-speed data input/output unit. The access routers can be respectively connected to one or more base stations (BS) 41, 42, and 43 which wirelessly communicate with a mobile node (MN). The base stations 41, 42 and 43 comprise antennas 41a, 42a, and 43a, respectively.

In an example of FIG. 1, a mobile node 51 sends a packet by specifying an IPha (IP-host address) of a mobile node 52 as the final destination. The router 31 which functions as an access router (AR1) receives the packet, performs routing selection, and transfers the packet to a router 32 (AR2) which is connected to the base station 42 capable of communicating with the mobile node 52 via a plurality of relay routers.

Note that the above packet transfer is performed via address switching as described in the background of the invention.

When the mobile node 52 moves out of range from the base station 42, the control of the mobile node 52 is handed over to another router (in a case of FIG. 1, router 33). In this case, routing selection is performed as shown in FIG. 1, the router 33 which functions as an access router (AR3) receives the packet and transfers them to the mobile node via a base station 43 and an antenna 43a connected to the access router.

As discussed before, a visited routing manager (VRM) performs packet routing and handover control when the mobile node is active, while a visited location manager (VLM) manages location information of the mobile node and performs paging when the mobile node is dormant.

Since the mobile node in active mode always moves around, the access router which transmits/receives packets to/from the mobile node keeps changing. Depending on how far or where the mobile node moves from a current access router (e.g. router 32 in FIG. 1), not only the access router but also the visited routing manager (VRM) might have to be changed.

In addition to the above, even when the mobile node is in dormant mode, since the mobile node always moves around, a visited location manager (VLM) might have to be changed, depending how far or where the mobile node moves from a current visited location manager.

The network system according to this embodiment performs the following process, depending on the state of the mobile node, and the movement of the mobile node.

(1) AR-AR Context Transfer

In general, this process is performed when the mobile node (MN) is active, and mobility management is performed under the same VRM before handover and after the handover.

In this approach, a current access router (e.g. AR2 in FIG. 1) informs a new access router (e.g. AR3 in FIG. 1) of the identity of the serving VRM. That is, the new AR shall fetch this information from the current AR at handoff.

Figure 2:
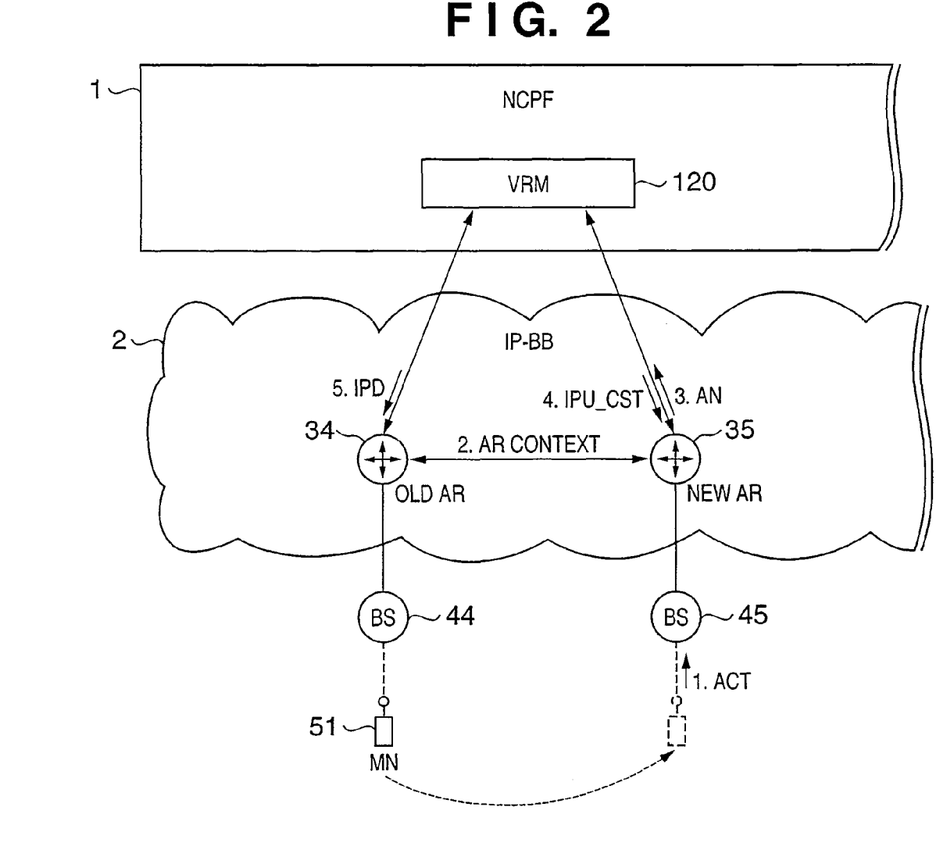
FIG. 2 is a conceptual block diagram showing AR-AR context transfer upon MN's handover when an MN is active.

FIG. 2 shows a conceptual block diagram showing AR-AR context transfer at handover when a mobile node (MN) is active.

When the mobile node (MN) 51 moves out of the connectivity range of the current access router (old AR) 34, the old AR can no longer transmit/receive packets to/from the mobile node 51 via a base station (BS) 44. When the mobile node 51 receives an advertisement signal from a new access router (new AR) 35 via a base station (BS) 45, the mobile node 51 sends an activation signal (ACT). This is shown as "1. ACT" in FIG. 2.

Then, the new AR 35 receives a routing cache table from the old AR 34. This is shown in as "2. AR context" in FIG. 2. Further, the new AR sends an activation notification to a visited routing manager (VRM) 120. This is shown as "3. AN" in FIG. 2. The VRM 120 responds to the notification, and sends back an acknowledgement and update signal. This is shown as "4. IPU_CST (IP Update Cache for Source Terminal)" in FIG. 2. Further, the VRM 120 sends a delete signal to the old AR 34 so that the old AR 34 deletes all information about the MN. This is shown as "5. IPD" in FIG. 2.

There are some requirements for this approach to work, though:

1. At login time or when moving to Active state, the first AR must select or be informed about the VRM to use.
2. The new AR must know the identity of the old AR.

The way the new AR knows the identity of the old AR is as follows.

1. The MN holds the old AR identifier. When sending the activation signal (ACT) to the new AR, the MN adds the old AR identifier to the activation signal. Then, the new AR extracts the old AR identifier from the received activation signal.

2. Each AR holds a list of neighboring ARs. When receiving the ACT from the MN, the new AR queries the listed ARs about the MN which has sent the ACT. If the old AR are contained in the listed ARs, and receives the query, the old AR sends a routing cache table to the new AR in response to the query. Note that the high-speed access memory may hold such a routing cache table.

3. If the old AR fails (this might be the reason for the MN to handover) there must be some fallback mechanism to let the new AR select or be informed about the VRM to use. This mechanism does not need to be very efficient or quick as it is invoked only as an exception.

As apparent from the above description, this approach is applicable if the ARs hold the related MN's context for other reasons such as QoS, data authentication, Header Compression, etc. In this case, the three requirements above must be fulfilled anyhow, and adding the identity of the VRM to the per-MN context of the AR is easy.

The benefit of this approach is its simplicity. The drawback is that it requires AR-AR context transfer to occur. This might result in a signaling increase between the old AR and the new AR. However, as long as the old AR and the new AR are closed to each other, such a signaling increase related to AR-AR context transfer are localized, total signaling including signaling between the old AR, the new AR and the VRM can be minimized.

Thus, even if the new AR has the current VRM address, if the new AR and the old AR are closed to each other, AR-AR context transfer takes place.

(2) HRM-Assisted VRM Change

In general, this process is performed when the mobile node (MN) is active, and mobility management is performed under the different VRMs before and after handover.

Usually, one VRM controls a plurality of access routers. There are many VRMs each handling a plurality of access routers in the NCPF. Thus, there must be boundaries between an AR controlled by a VRM and an AR controlled by another VRM, although these ARs are neighbor to each other.

So, when a mobile node moves and crosses over such a boundary from an AR to a neighboring AR, these two neighboring ARs might be controlled by different VRMs.

In such a case, when a new AR receives an activation signal (ACT), the new AR has no way to receive information on the mobile node.

This approach is applicable when the AR-AR context transfer mechanism is not desirable or available as described above. This can also be the case if one of the 3 requirements listed in the previous section is not fulfilled for some reasons.

Figure 3:
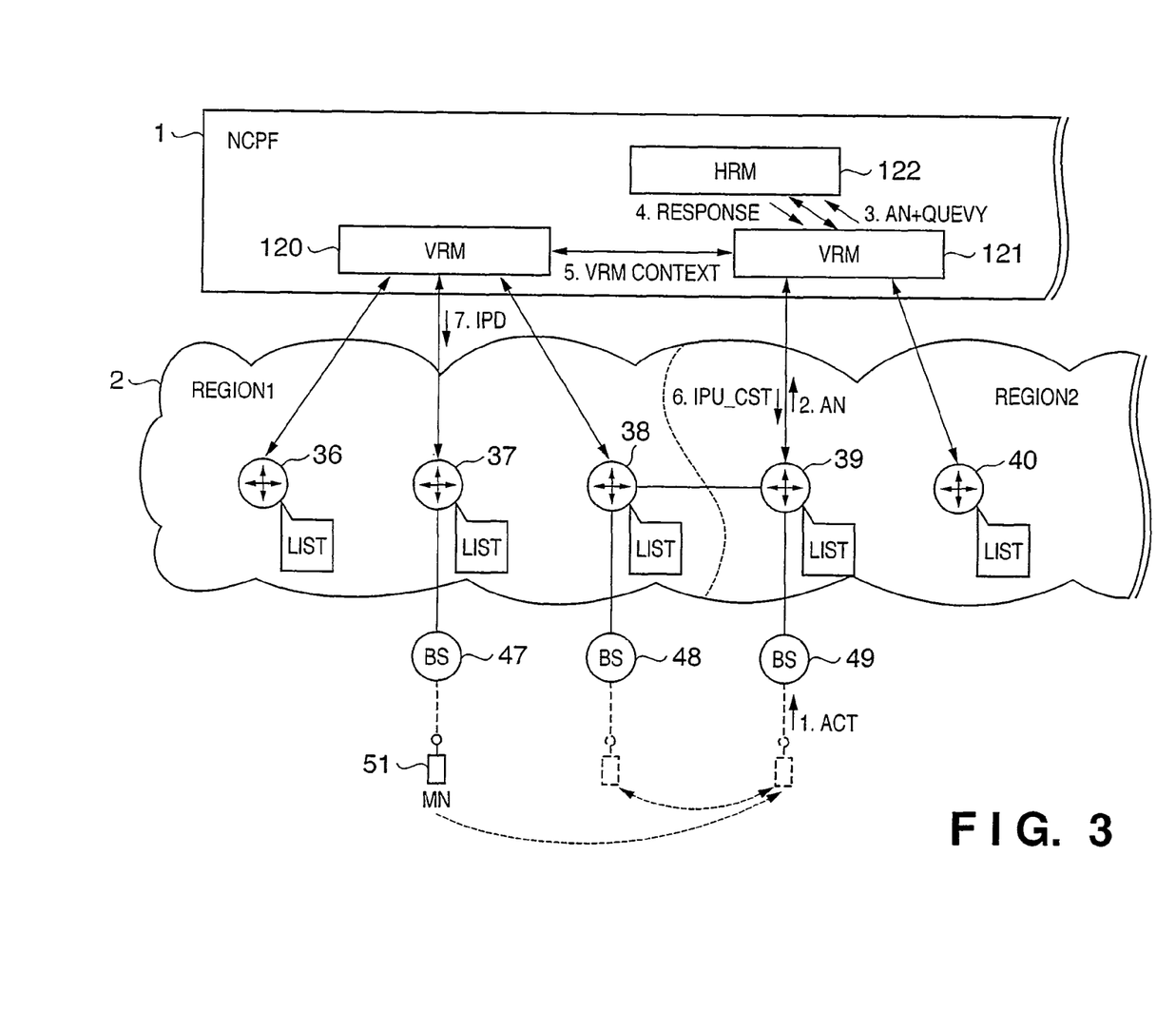
FIG. 3 is a conceptual block diagram showing HRM-assisted VRM-VRM context transfer upon MN's handover.

FIG. 3 is a conceptual block diagram showing HRM-assisted VRM-VRM context transfer upon MN's handover.

In this approach, each AR has a default VRM selection mechanism configured. The basic idea is, that ARs are grouped into regions, and ARs within a region select the same VRM for the same MN. In an example of FIG. 3, routers 36, 37 and 38 are grouped into REGION 1, while routers 39 and 40 are grouped into REGION 2. routers 36-38 within REGION 1 select the VRM 120 as a default VRM, while routers 39 and 40 select the VRM 121 as a default VRM. That is, while the MN moves inside a region the correct VRM will be selected as shown in FIG. 3.

More specifically, assuming that the mobile node (MN) 51 is presently communicating with an access router (AR) 37 via a base station (BS) 47, even if the mobile node 51 moves to an access node 36 or access node 38, the same VRM 120 still performs mobility management for the mobile node 51.

However, if the MN moves out of the VRM region, the Activate Notification will be sent to a new VRM not knowing about the MN. According to the example of FIG. 3, when the mobile node (MN) 51 moves out of the REGION 1, and enters into the REGION 2, the mobile node 51 sends an activation signal (1. ACT) to the access router 39. In response to the activation signal, the access router 39 sends an activate notification (2. AN) to the VRM 121.

In this case, the new VRM (VRM 121) will contact the HRM (HRM 122) of the MN and obtain the identity of the old VRM (VRM 120). These steps are shown as "3. AN+Query" and "4. Response" in FIG. 3. Then a VRM-VRM context transfer takes place (5. VRM context in FIG. 3) and the new VRM becomes the serving VRM. Then, the new VRM (VRM 121) issues an update signal (6. IPU_CST) so that the access router 39 can update its information about the mobile node 51. This VRM will serve the MN as long as it is in the new region.

Meanwhile, the old VRM (VRM 120) sends a delete signal (7. IPD in FIG. 3) so that the access router 37 deletes its information about mobile node 51.

The default VRM selection in the AR can be one of the following.

1. The default VRM can be statically configured in the AR. Configuring the same VRM for neighbouring ARs results in sending the MN's IPra information to the current VRM with high probability.

2. A prioritized list of VRMs is statically configured in the AR. According to the example of FIG. 3, each of all routers has such a list (indicated as "LIST"). The AR probes the first VRM on the list. If it is not reachable or not working, it probes the next until an operational VRM is found. This is a simple extension of the previous approach that is more robust to VRM failures. It also ensures that if the list is the same in neighbouring ARs then the same VRM is selected for the MN with high probability.

3. A hash function can also be configured in the AR along with a list of prioritized VRM lists. The AR first computes the hash of the MN's identifier (IPha) and selects one of the prioritized lists based on the hash. Then, it contacts the VRMs on the list until an operational one is found. This is an extension of #2 above that sill guarantees that when neighbouring ARs are configured similarly the same VRM will be selected for the same MN. In addition, this option allows load balancing among VRMs, thus more ARs can be configured the same way without overloading one particular VRM. In an extreme case, regions of the network, or the entire network itself can be configured the same way.

All three solutions above aims to ensure that the same VRM is selected for the same MN in similarly configured ARs. The AR, then, notifies the selected VRM about the MN and its new IPra. If the selected VRM already has information about the MN then the correct VRM has been reached and no further VRM selection action is needed.

If the selected VRM has no information on the MN, it first decides, if it can serve the MN or not. If not, then it forwards the information to a different VRM based on local policies. If that VRM has information on the MN, then the serving VRM is found. If not, then the VRM also has the option of rejecting the MN and can further forward the MN. Finally, if one VRM accepts the MN, without having its state, the VRM notifies the HRM of the MN.

If the HRM does not know anything about the MN, then this is an activation or a login and the VRM selection is final. If the HRM already has information on the MN, it knows the current VRM. If that is different from the one now reporting, the HRM tells it to the reporting VRM. Then the reporting VRM initiates VRM-VRM context transfer.

Although we described how VRMs can refuse to serve a MN, we expect a VRM to accept any MN in most cases. If the VRM dimensioning is proper, then most VRMs will not be overloaded.

According to this approach, when a MN moves to a new AR whose default VRM is different from the current one, a VRM change will happen. Depending on the detailed design, this may also result in an anchor change. That is, if the VRM context does not contain the current anchor and anchor routing address, or if the new VRM cannot command the old ANR for any reason, a new ANR must be allocated and used. This will result in a new routing address for the MN and all subscribed ARs will need to be notified. This is not a serious issue since handoffs resulting in a VRM change should constitute a minority.

However, if the MN ping-pongs between two ARs having a different VRM, this may result in excessive load. In the example of FIG. 3, if the mobile node 51 moves between the access routers 38 and 39, thus becoming an MN ping-pong.

A possible solution is to let the old VRM refuse the context transfer. In this way, the VRM that knows about the past of the MN can detect ping-pong handoffs and force the use of the same VRM (and ANR) during such events. In any case the HRM must be promptly notified about the actual VRM and routing address.

(3) VLM Selection

In case of VLM selection, AR-AR context transfer is not applicable since the ARs do not track Dormant MNs. However, HRM-assisted VRM change can be applied to VLMs, as well. ARs can be configured with a default VLM selection algorithm that selects the same VLM with high probability for neighbouring ARs. If the VLM does not recognise the MN, it contacts the HLM that replies with the identity of current VLM and then a VLM change can be performed. Ping-pong VLM changes can be prevented the same way as for VRMs.

Figure 4:
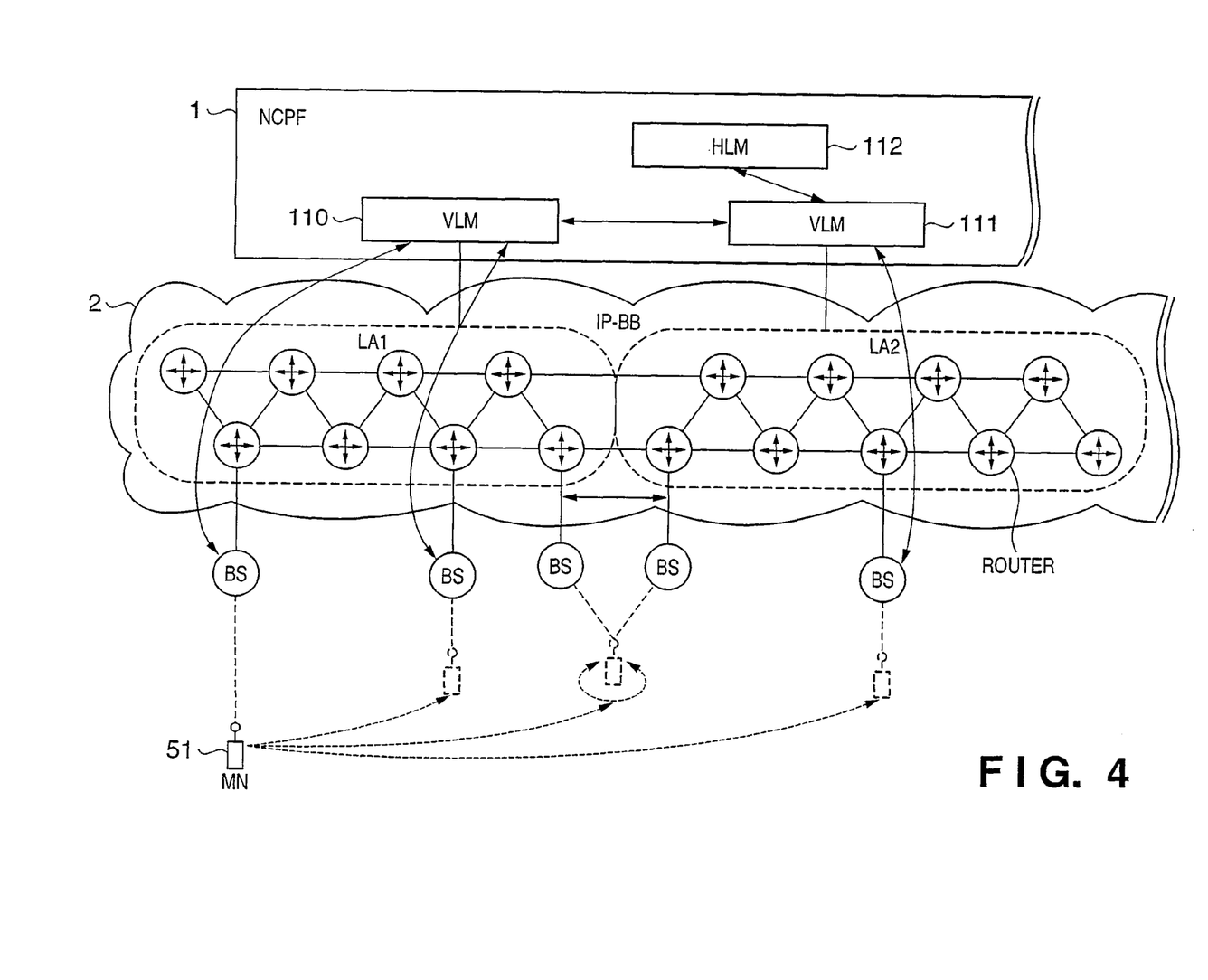
FIG. 4 is a conceptual block diagram showing HLM-assisted VLM-VLM context transfer upon MN's handover when the MN is dormant.

FIG. 4 is a conceptual block diagram showing HLM-assisted VLM-VLM context transfer upon MN's handover when an MN is dormant.

As discussed before, a plurality of access routers are grouped into location areas (LAs). In an example of FIG. 4, a number of access routers (ARs) are grouped into LA1 and LA2. A VLM 110 is responsible for location management of ARs in LA1, while a VLM 111 is responsible for location management of ARs in LA2. As long as the mobile node 51 which is in dormant state moves within LA1, the VLM 110 can manage location information of the mobile node 51.

However, if the mobile node 51 moves out of LA1, and enters into LA2, a new VLM (VLM 111) takes over location management. In this case, since the new VLM does not have any information about the mobile node 51, the new VLM queries the HLM 112 about the mobile node 51. After receiving the identity of the mobile node 51, the new VLM receives context about the mobile node 51 from an old VLM (VLM 110).

Figure 5:
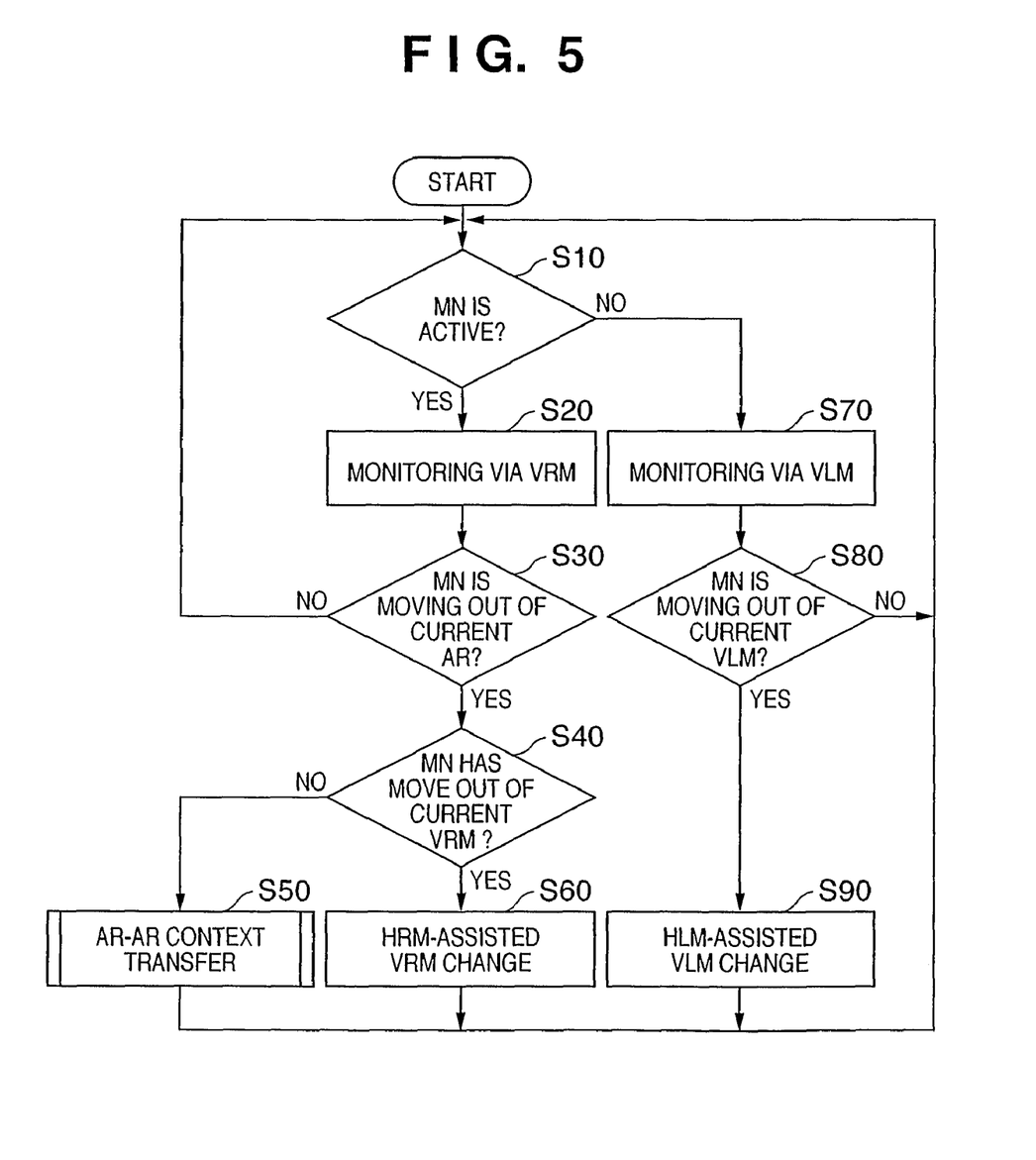
FIG. 5 is a flowchart showing mobility management process.

The above three approaches are summarized in FIG. 5.

FIG. 5 is a flowchart showing mobility management process.

At step S10, it is examined whether or not a mobile node (MN) is active. If the mobile node is active, the process proceeds to step S20 and monitors the mobile node via a VRM. On the other hand, if the mobile node is dormant, the process proceeds to step S70 and monitors the mobile node via a VLM.

At step S30, it is examined whether or not the mobile node is moving out of a current AR's connectivity range. If the mobile node is still within the connectivity range of the current AR, the process returns to step S10 to examine the state of the mobile node. On the other hand, if it is determined that the mobile node moving out of the connectivity range, the process proceeds to step S40.

At step S40, it is further examined whether or not the mobile node is moving out of a current VRM's control range. If it is determined that the mobile node is still within the control range of the current VRM, the process proceeds to step S50 and performs AR-AR context transfer and handover as discussed above. After step S50, the process returns to step S10.

On the other hand, if it is determined at step S40 that the mobile node is moving out of the control range of the current VRM, the process proceeds to step S60 to perform HRM-assisted VRM change and handover as discussed above. After step S60, the process returns to step S10.

When the mobile node is dormant, the VLM keeps monitoring the mobile node at step S70. At step S80, it is examined by the VLM whether or not the mobile node is moving out of a control range of the VLM. If it is determined that the mobile node is still within the control range of the current VLM, the process returns to step S10 to examine the state of the mobile node.

On the other hand, if it is determined that the mobile node is moving out of the controllable range of the current VLM, the process proceeds to step S90 and performs an HLM-assisted VLM change. After step S90, the process returns to step S10.

Thus, according to the embodiment as described above, depending on the state of a mobile node and the movement of the mobile node, a VRM or VLM is suitably selected such that the number of VRM and VLM changes is minimized. As a result, context transfer between a new entity and an old entity is minimized, thus resulting in a load reduction when handover takes place.

As many apparently widely different embodiments of the present invention can be made without departing from the spirit and scope thereof, it is to be understood that the invention is not limited to the specific embodiments thereof except as defined in the appended claims.

The invention claimed is:

1. A method for mobility management used in an IP-based network system, which contains a plurality of access routers (AR), location managers (LM) and routing managers (RM), through which a mobile node (MN) transmits and receives information, the method comprising the steps of:
   determining whether or not the mobile node is active;
   monitoring the mobile node via a visited routing manager (VRM) where the mobile node is currently located if the mobile node is active;
   first determining whether or not the mobile node is moving out of a connectivity range from one of the plurality of access routers which is currently communicating with the mobile node, wherein the plurality of access routers is grouped into regions, each region having two or more access routers which select the same visited routing manager for the same mobile node;
   second determining whether the mobile node is moving out of a control range of the visited routing manager (VRM) which is currently managing the mobility of the mobile node;
   transferring context which the current access router holds to a new access router in a case where it is determined at said first and second determining steps that the mobile node is moving out of the connectivity range from the access router but is still within the control range of the current visited routing manager; and
   transferring context which the current visited routing manager holds to a new visited routing manager under an assist by a home routing manager (HRM) in a case where it is determined at said first and second determining steps that the mobile node is moving out of the connectivity range from the access router and the control range of the current visited routing manager.

2. The method according to claim 1, further comprising the steps of:
   receiving an advertisement signal from the new access router at the mobile node prior to transferring the context; and
   sending an activation signal from the mobile node to the new access router in response to the advertisement signal.

3. The method according to claim 2, further comprising the step of sending an activation notification from the new access router to the visited routing manager (VRM) after transferring the context.

4. The method according to claim 1, wherein the context transfer is performed in a form of routing cache table.

5. The method according to claim 1, wherein the location manager (LM) and the routing manager (RM) are responsible for mobility management.

6. The method according to claim 1, wherein said transferring step is performed in a case where it is determined at said second determining step that the mobile node is still located within the control range of the visited routing manager (VRM) which is currently managing the mobility of the mobile node.

7. The method according to claim 1, wherein an identity of the current access router is informed of the new access router prior to transferring the context.

8. The method according to claim 1, further comprising the steps of:
    sending an activation signal from the mobile node to a new access router where the mobile node is newly moved in; and
    sending an activation notification from the new access router to the new visited routing manager in response to the activation signal.

9. The method according to claim 8, further comprising the steps of:
    querying the home routing manager of the mobile node about information on the current visited routing manager by the new visited routing manager in response to the activation notification; and
    receiving a response about the information on the current visited routing manager from the home routing manager prior to transferring the context.

10. The method according to claim 1, wherein each of the plurality of access routers has a prioritized list of visited routing managers for selecting the new visited routing manager used when receiving an activation signal (ACT) from the mobile node.

11. An IP-based network system, which contains a plurality of access routers (AR), location managers (LM) and routing managers (RM), through which a mobile node (MN) transmits and receives information, wherein the plurality of access routers is grouped into regions, each region having two or more access routers which select the same visited routing manager for the same mobile node, wherein each of said access routers comprises:
    means for monitoring mobility of the mobile node where it is currently located;
    means for determining whether or not a new mobile node is moving in a connectivity range; and
    means for notifying a corresponding routing manager the new mobile node is moving in, in accordance with the determined result, and
    each of said routing managers comprises:
        means for detecting that the new mobile node is moving in a control range, based on the notification; and
        means for receiving context transferred from another routing manager which was responsible for mobility management of the new mobile node, under an assist by a home routing manager (HRM).

12. A router used in IP-based network system, which contains a plurality of access routers (AR), location managers (LM) and routing managers (RM), through which a mobile node (MN) transmits and receives information, wherein the plurality of access routers is grouped into regions, each region having two or more access routers which select the same visited routing manager for the same mobile node, the router comprising:
    means for monitoring mobility of the mobile node where it is currently located;
    means for determining whether or not the mobile node, which is currently communicating, is moving out of a connectivity range;
    means for transferring context which is currently held to a new access router in accordance with the determined result;
    means for notifying a corresponding routing manager that a new mobile node is moving in; and
    means for receiving an update signal from the corresponding routing manager assisted by a home routing manager (HRM) and updating information about the new mobile node.

* * * * *

UNITED STATES PATENT AND TRADEMARK OFFICE
CERTIFICATE OF CORRECTION

PATENT NO.      : 8,077,648 B2  
APPLICATION NO. : 12/376936  
DATED           : December 13, 2011  
INVENTOR(S)     : Valko et al.

Page 1 of 1

It is certified that error appears in the above-identified patent and that said Letters Patent is hereby corrected as shown below:

In Drawings

In Fig. 1, Sheet 1 of 5, for Tag "1", delete "MM" and insert -- MN --, therefor.

Signed and Sealed this  
Fourteenth Day of February, 2012

David J. Kappos  
*Director of the United States Patent and Trademark Office*